(12) United States Patent  (10) Patent No.: US 7,401,562 B2
Nimberger  (45) Date of Patent: Jul. 22, 2008

(54) EMERGENCY SHUTOFF SYSTEM AND METHOD

(75) Inventor: Spencer M. Nimberger, Houston, TX (US)

(73) Assignee: PGI International, Ltd., Houston, TX (US)

( * ) Notice: Subject to any disclaimer, the term of this patent is extended or adjusted under 35 U.S.C. 154(b) by 0 days.

(21) Appl. No.: 11/893,858

(22) Filed: Aug. 17, 2007

(65) Prior Publication Data

US 2008/0041285 A1 Feb. 21, 2008

Related U.S. Application Data

(60) Provisional application No. 60/822,779, filed on Aug. 18, 2006.

(51) Int. Cl.
*F16K 17/36* (2006.01)
*F16K 35/00* (2006.01)

(52) U.S. Cl. .................... 111/119; 111/200; 137/68.15; 251/89.5; 239/722; 239/578

(58) Field of Classification Search ................. 239/146, 239/147, 722, 569, 578, 602; 111/118–129, 111/200; 137/68.14–68.17; 251/89.5
See application file for complete search history.

(56) References Cited

U.S. PATENT DOCUMENTS 7,036,441 B2 5/2006 Scudder

OTHER PUBLICATIONS

Emerson-Fisher, Instruction Manual Type C407-10 Internal Valves, Jan. 2002, 8 pages.

*Primary Examiner*—Christopher J. Novosad
(74) *Attorney, Agent, or Firm*—Browning Bushman P.C.

(57) ABSTRACT

A safety system is provided for an anhydrous ammonia nurse tank (4) pulled by a tractor (1) with a tool bar applicator (2). The system includes a safety valve (10), and a breakaway coupling or connector (12) along a flexible hose (11) from the nurse tank to the applicator. The safety shutdown valve (10) closes in response to a break in the electrical connector in the event of a pull away or manual activation of a safety switch.

20 Claims, 10 Drawing Sheets

_US 7,401,562 B2_

EMERGENCY SHUTOFF SYSTEM AND METHOD

RELATED CASE

The present application claims priority from U.S. Ser. No. 60/822,779 filed Aug. 18, 2006.

FIELD OF THE INVENTION

The present invention relates to emergency shutoff systems and, more particularly, to a passive (automatic) and active (manual) shutoff system for distributing anhydrous ammonia to fields.

BACKGROUND OF THE INVENTION

Various types of emergency shutoff systems have been proposed, including the system disclosed in U.S. Pat. No. 7,036,441. The system disclosed in the '441 patent allows an operator to close off a line in the event of a leak, and automatically shuts the system down in the event of a nurse tank breakaway. Manual valve closure is thus permitted by the operator.

The prior art also includes valves with a "cam over in line" feature, as embodied in the Fisher Model C 407-10 internal valve. An excess flow feature of the valve enhances the unreliability of excess flow shutoff valves, so that the valve closes in response to a leak condition. One problem with this valve design is that errors in piping the system may result in "leaks" of varying magnitude that may undesirably result in closing the excess flow valve.

The disadvantages of the prior art are overcome by the present invention, and an improved emergency shutoff system and method are hereinafter disclosed.

SUMMARY OF THE INVENTION

In one embodiment, a system is provided for activating a safety valve between a withdrawal valve on an anhydrous ammonia nurse tank and a breakaway coupling along the fluid line interconnecting the nurse tank with a field applicator supported on the tractor. The system includes a tractor mounted shutdown switch, a battery power supply, an electrical conductor between the shutdown switch, the battery power supply, and the safety valve, and an electrical connector along the electrical conductor and separable during a pullaway of the tractor from the nurse tank. The safety valve includes an electromagnet for holding the valve open, and the valve automatically closes in response to one of activation of the shutdown switch or separation of the electrical conductor.

These and further features and advantages of the present invention will become apparent from the following detailed description, wherein reference is made to the figures in the accompanying drawings.

DESCRIPTION OF THE PREFERRED EMBODIMENTS

Figure 1:
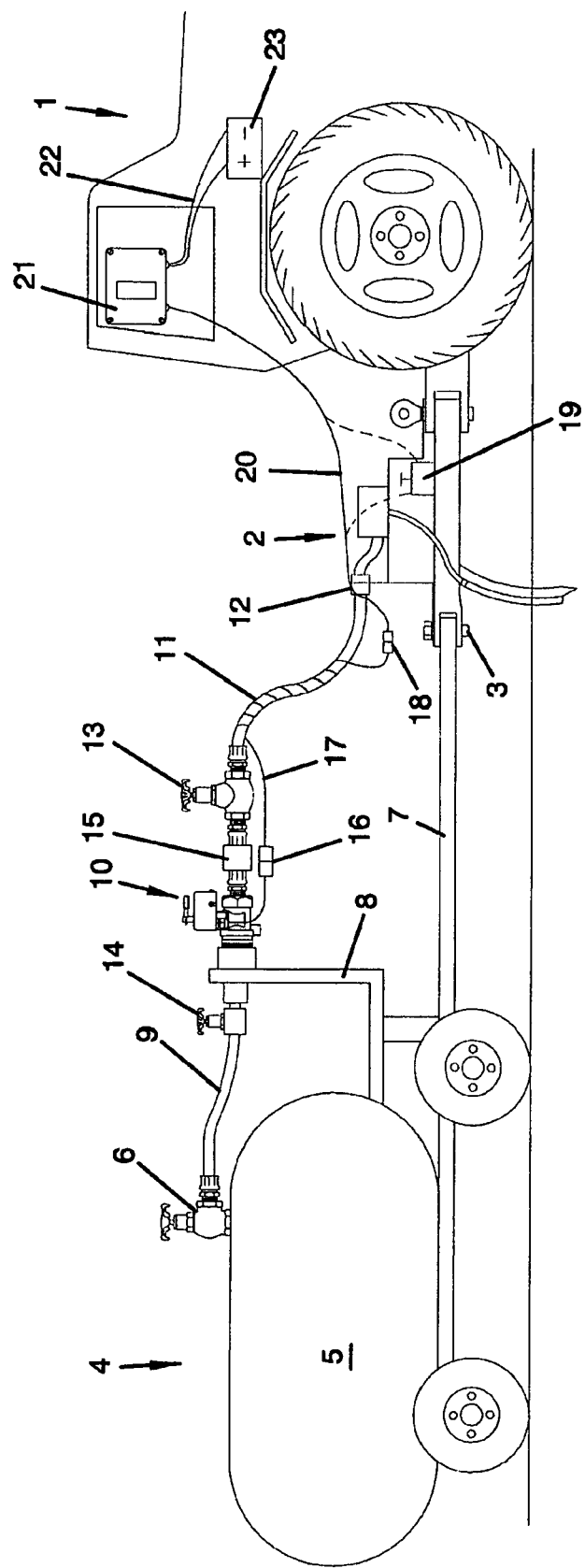
FIG. 1 illustrates a tractor interconnected with a nurse tank.

FIG. 1 shows a tractor 1 having tool bar attachment or applicator 2 hitched by hitch pin 3 to nurse tank 4. Nurse tank 4 is composed of tank 5, withdrawal valve 6, hitch bar 7, bulkhead 8 and product hose 9. Bulkhead 8 provides a rigid mounting point for safety valve 10 so as to protect piping and hoses upstream of the safety valve 10 in the event of a pull away occurrence which will stress and possibly rupture the tank to tool bar hose 11.

The fertilizer delivery system requires a breakaway coupling 12 at the delivery hose to tool bar interface. It's function is to separate the tool bar from the delivery hose without rupture in a pull away event typically caused when hitch pin 3 breaks or pops out of the tool bar, or if the operator fails to connect a new tank with the tool bar before pulling away. The flow line from the nurse tank delivers fertilizer to the field, conventionally applied with a knife blade, as shown in FIG. 1.

Flexible delivery hose 11 is kept attached to tool bar 2 in normal operation. To change out an empty nurse tank, hose end valve 13 and nurse tank valve 14 are closed. Then acme connection 15 is loosened to separate the product hose 11 from the empty nurse tank 4. A full tank is put in position and the sequence is reversed to connect the full tank.

The present invention may also be used in systems where the connect/disconnect point is at the breakaway coupling 12 and the product delivery hose stays with the nurse tank. In many applications, it is preferred that product delivery hose stays with the tractor, thereby reducing redundant hose costs.

The system in FIG. 1 is composed of safety shutoff valve 10, electrical connector 16, hose cable 17, pullable electrical connector 18, optional tool bar mounted electrical circuit interrupter(s) (19), tool bar to cab harness 20, main cab mounted system shutdown switch 21, shutdown to power harness cable 22 and battery power supply 23.

In normal operation, the system switch 21 is kept on and only switched off in the event of an emergency requiring closure of the shutoff valve. Likewise, pullable electrical connector 18 is left connected and would be disconnected only by a pull away that caused the breakaway coupling 12 to separate the delivery hose 11 from the tool bar 2. The design of connector 18 is such that it will not be damaged in a pull away, and can be easily reconnected after the event.

Harness 17 is wrapped and periodically tie wrapped around the product delivery hose 11. During a nurse tank change out, connector 16 is disconnected along with hose connector 15 and reconnected when the new nurse tank is connected. In this manner, power is routed from the battery to an electromagnet in safety valve 10. The operator will then rotate the lever on valve 10 to the open position and the magnet will hold the valve in the open position. The system is activated and product delivery can begin. If power is interrupted by activation of in cab switch 21 or pull away connector 18, the valve 10 will close.

Figure 2:
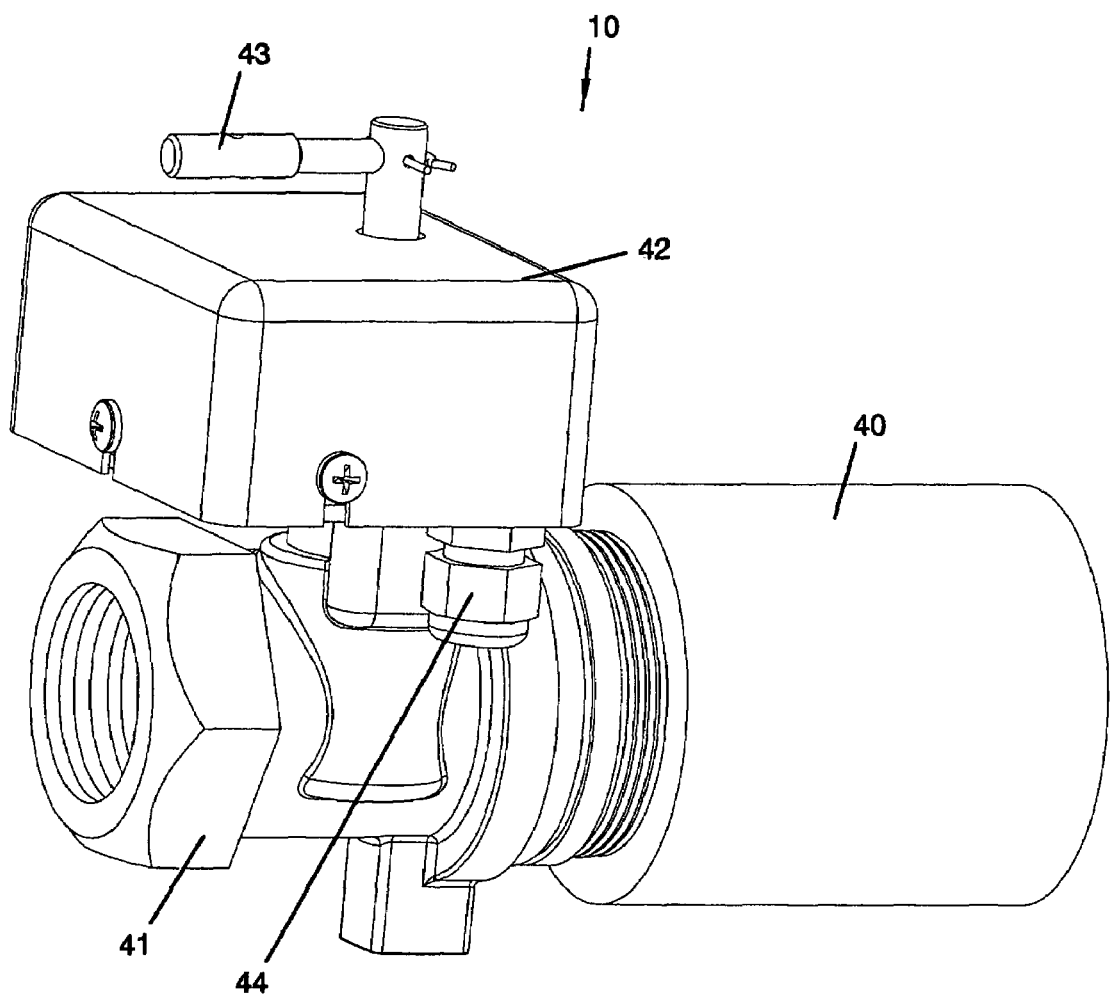
FIG. 2 is an isometric view of the safety valve shown in FIG. 1.

FIG. 2 shows valve 10 in isometric view. It is composed of reducer bushing 40, body 41, actuator cover 42, actuation lever 43 and cable strain relief fitting 44.

Figure 3:
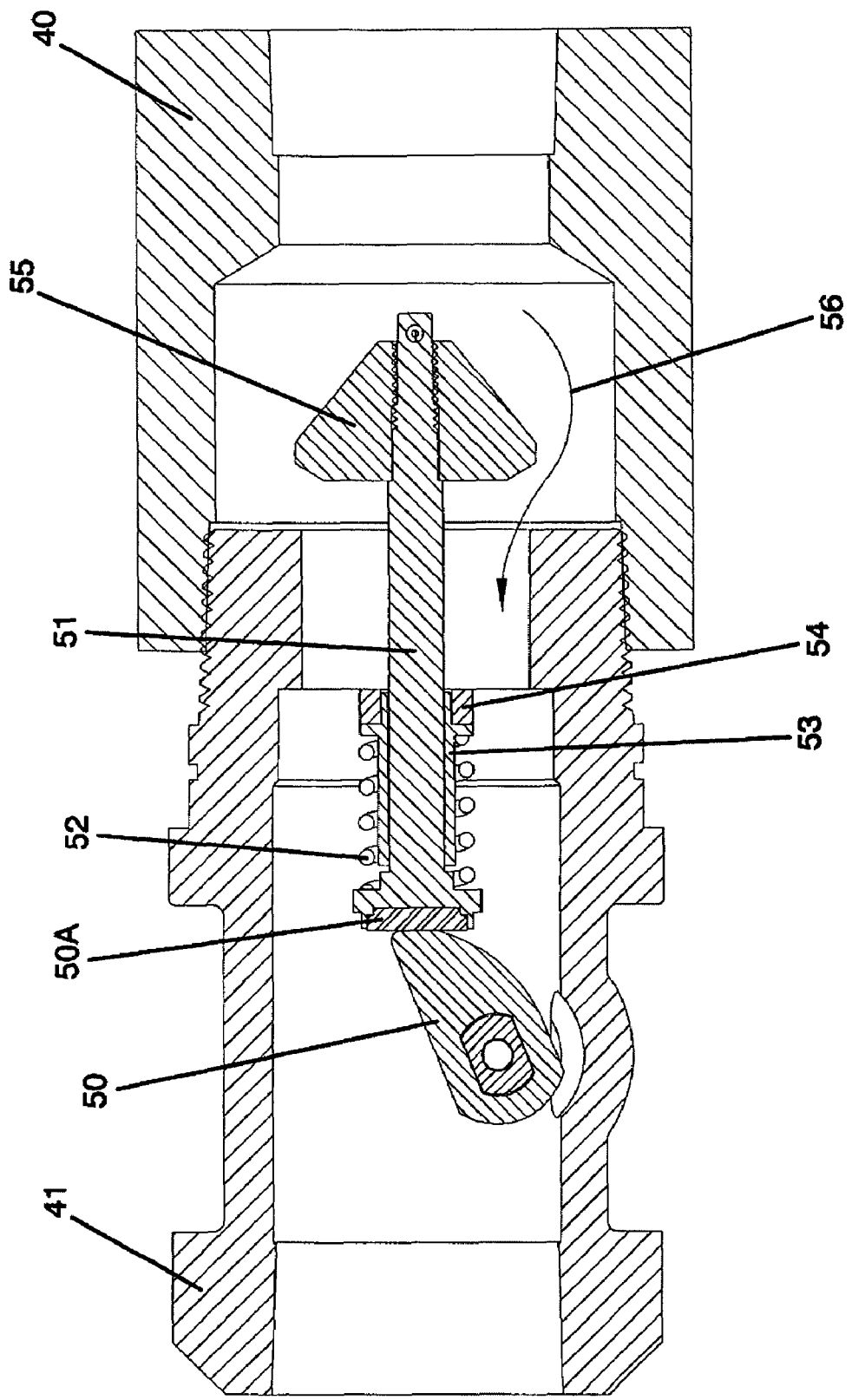
FIG. 3 is a cross-sectional view of the safety valve shown in FIG. 2.

FIG. 3 shows the valve in cross section through the center of the body and reducer bushing. Cam 50 impinges on stem pad 50A attached to stem 51. Stem 51 is guided by guide bushing 53 engaged in spider 54. Stem 51 is attached to poppet 55 which is open against the flow stream 56. Reducer bushing is used to facilitate flow around the largest diameter of poppet 55 and typically to mount the assembly to the tool bar bulkhead 8 in FIG. 1 by welding the bushing to the bulkhead.

Figure 4:
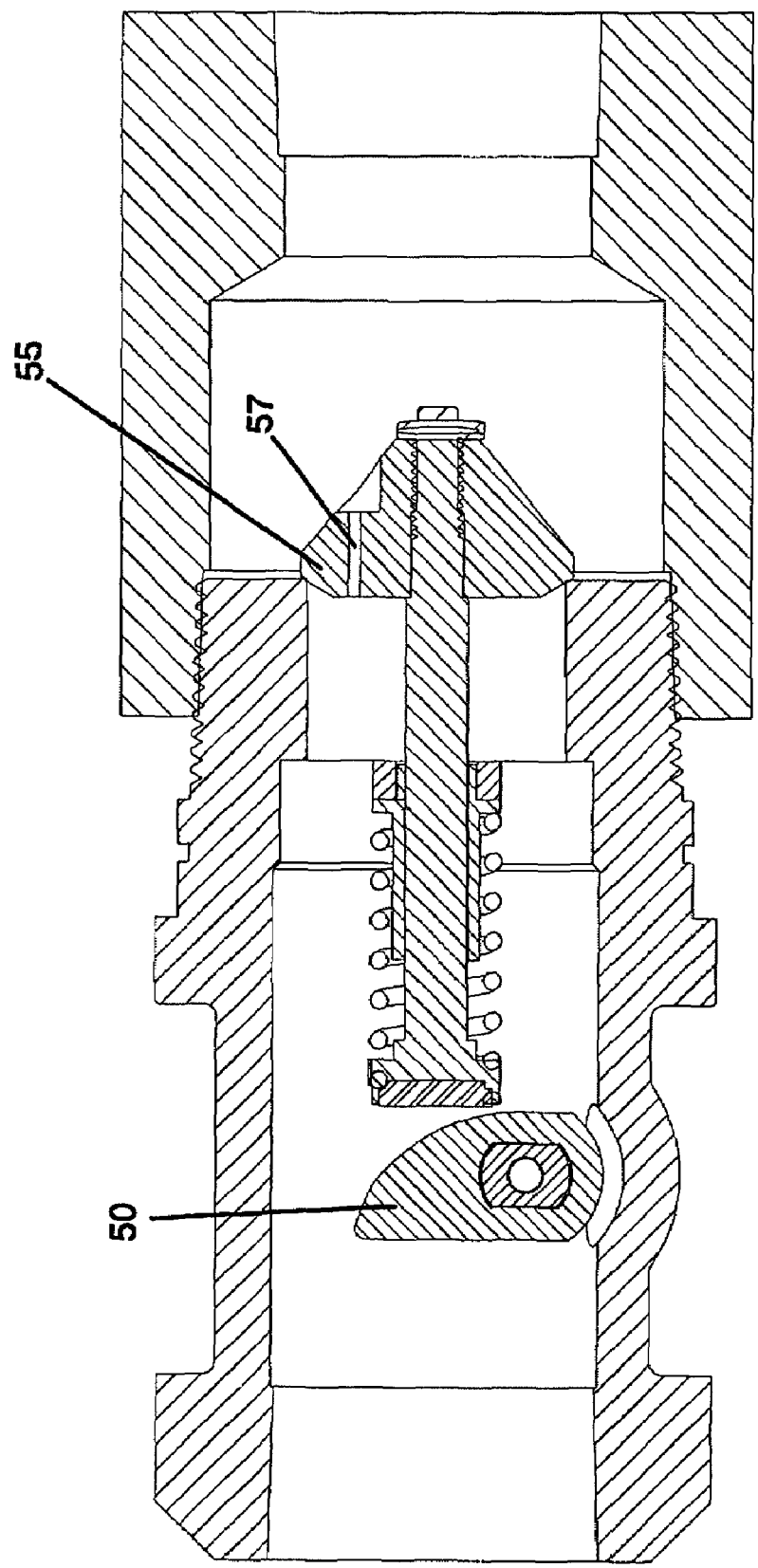
FIG. 4 illustrates the safety valve in a closed position.

FIG. 4 shows the valve in the closed position after interruption of the electrical power has allowed the cam to return to it's home position aided by the flow of product impinging on the poppet 55. Bleed hole 57 in poppet 55 allows the system to pressure equalize after a shutdown and allow the valve 10 to be opened.

Figure 5:
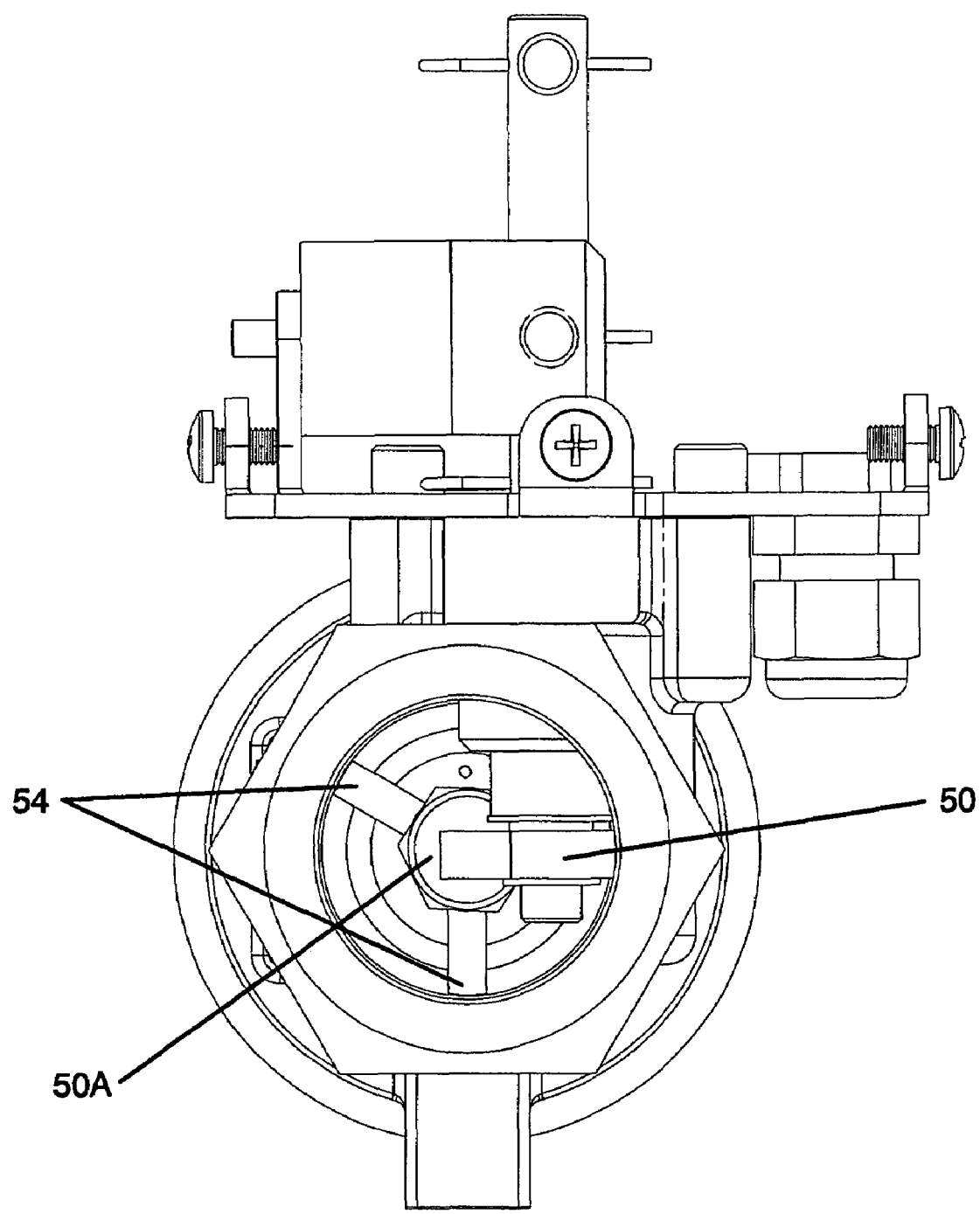
FIG. 5 is an end view of the valve.

FIG. 5 is an end view of valve 10 showing cam 50, stem pad 50A and two of the three legs of spider 54.

Figure 6:
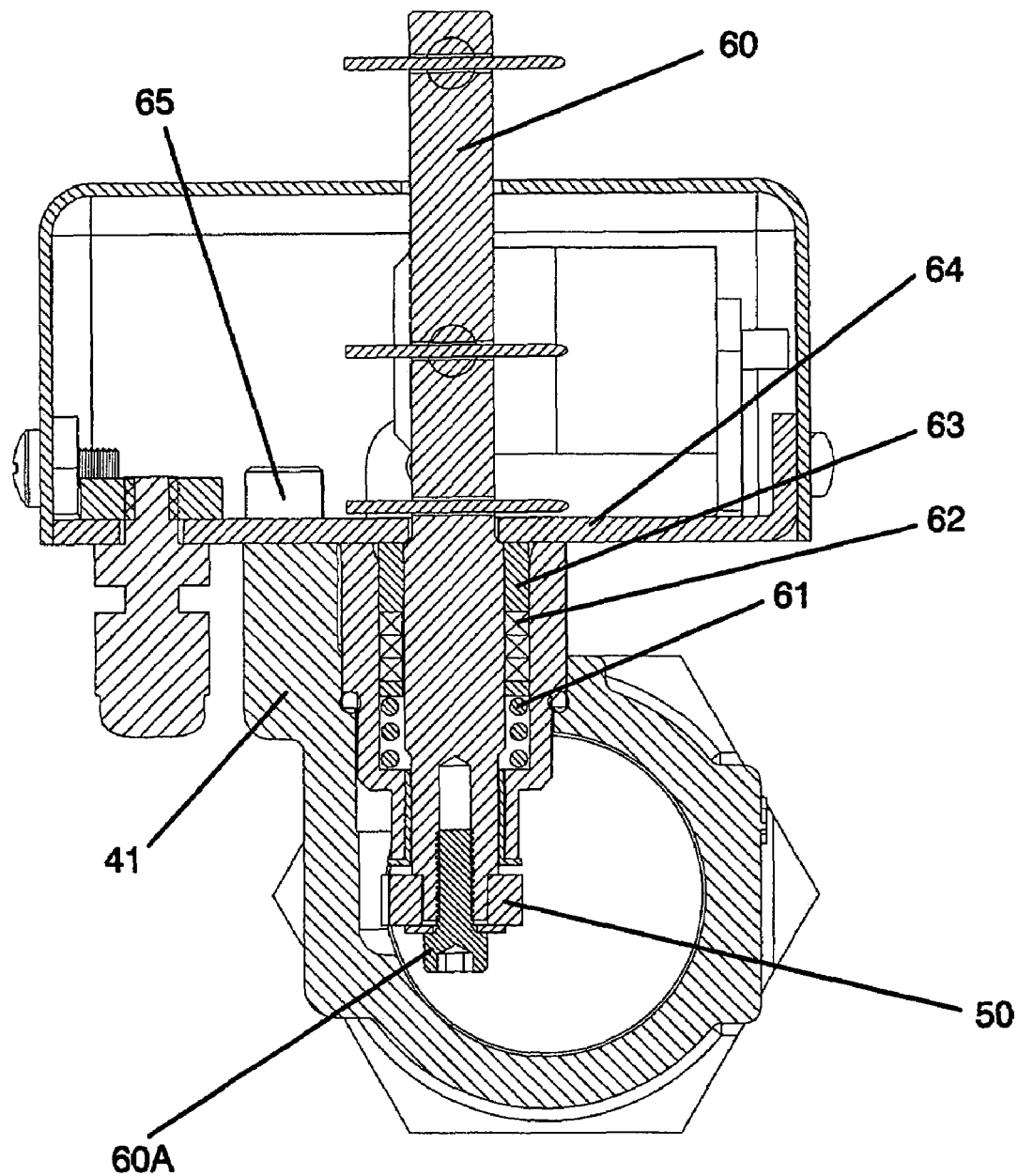
FIG. 6 is a sectional view through the cam stem of the valve.

FIG. 6 is a section through the cam stem 60. Cam 50 is attached to stem 60 by cam retaining screw 60A. Internal pressure is contained by Teflon™ packing set 62 compressed in place by packing follower 63 and packing spring 61 and held in place by plate 64 attached to body 41 by retaining screws 65.

Figure 7:
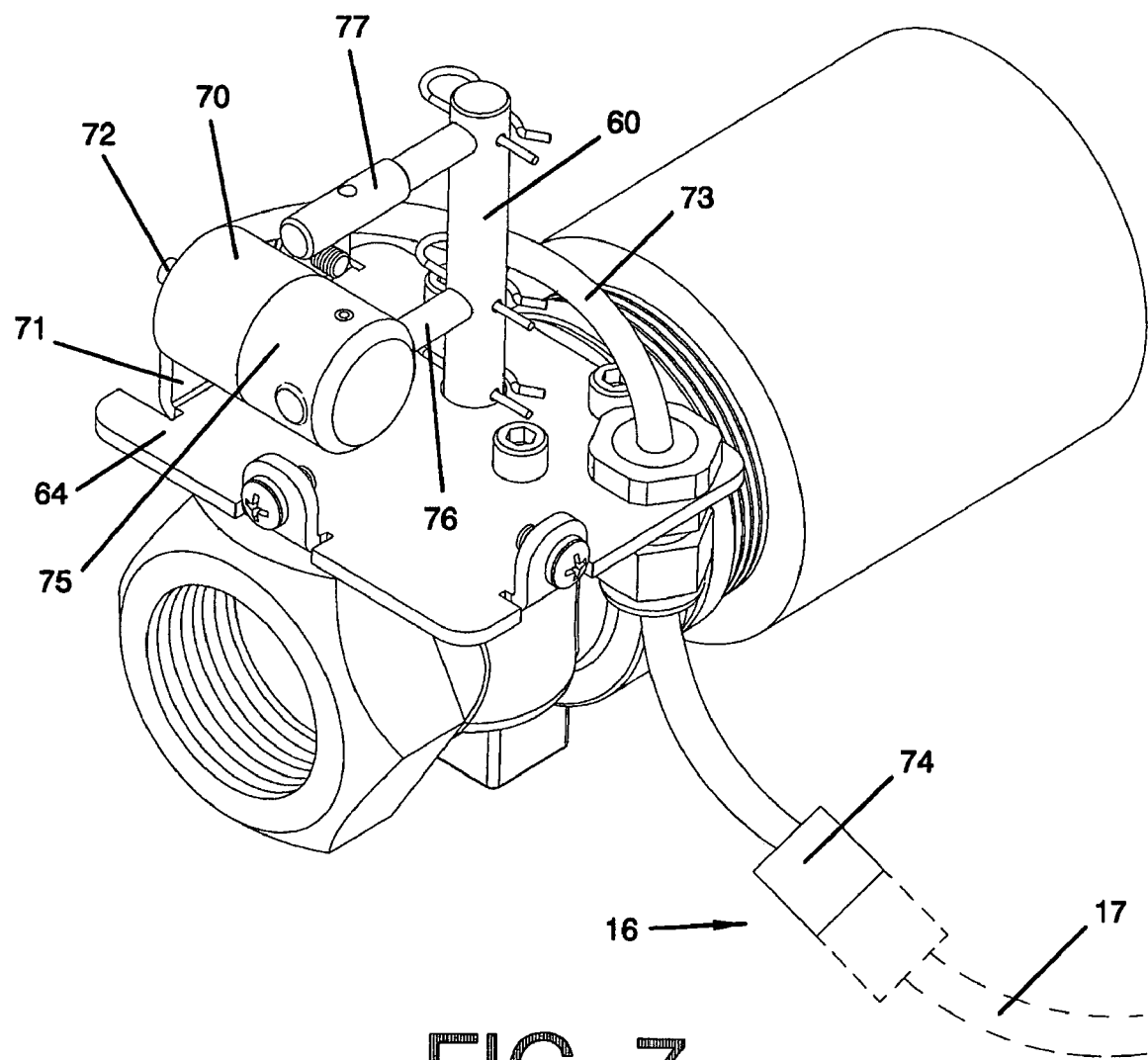
FIG. 7 is an isometric view of a valve with the actuator cover removed.

FIG. 7 is an isometric view of valve 10 with the actuator cover removed. Electromagnet 70 is attached to plate tab 71 on plate 64 by screw 72. Cable 73 connects the coil of the magnet 70 to connector half 74 through cable 73. Cable half 74 is half of connector 16 in FIG. 1 connected to hose cable 17. Low carbon steel member 75 is attached to pin 76 which is attached to shaft 60. When magnet 70 is energized and steel member 75 is brought in to contact with it by manually rotating actuation lever 77, the magnet hold the valve open against the closing force of spring 52 in FIG. 3.

Figure 8:
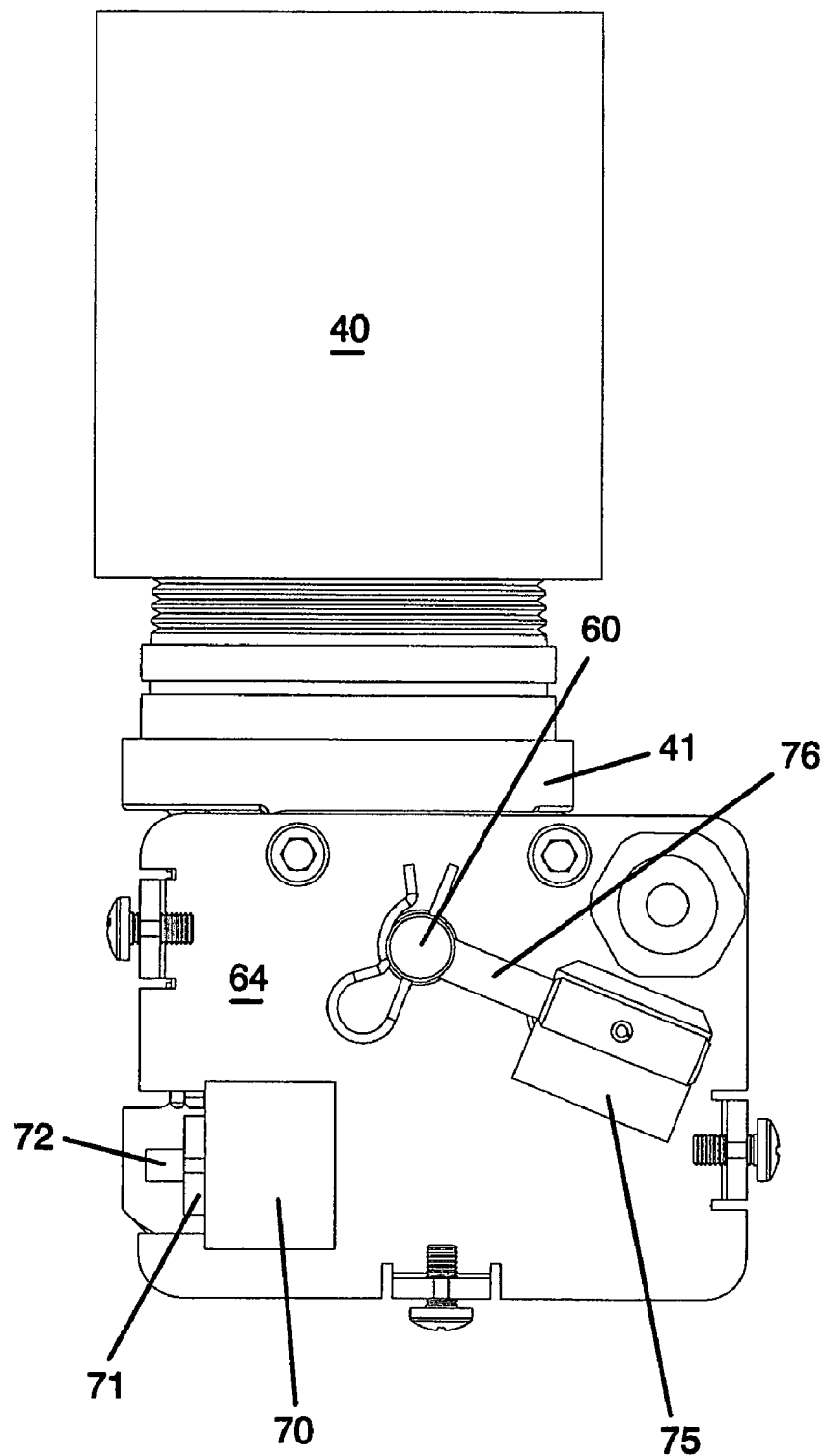
FIG. 8 is a top view of the valve in the closed position.

FIG. 8 is a top view of the valve in the closed position.

Figure 9:
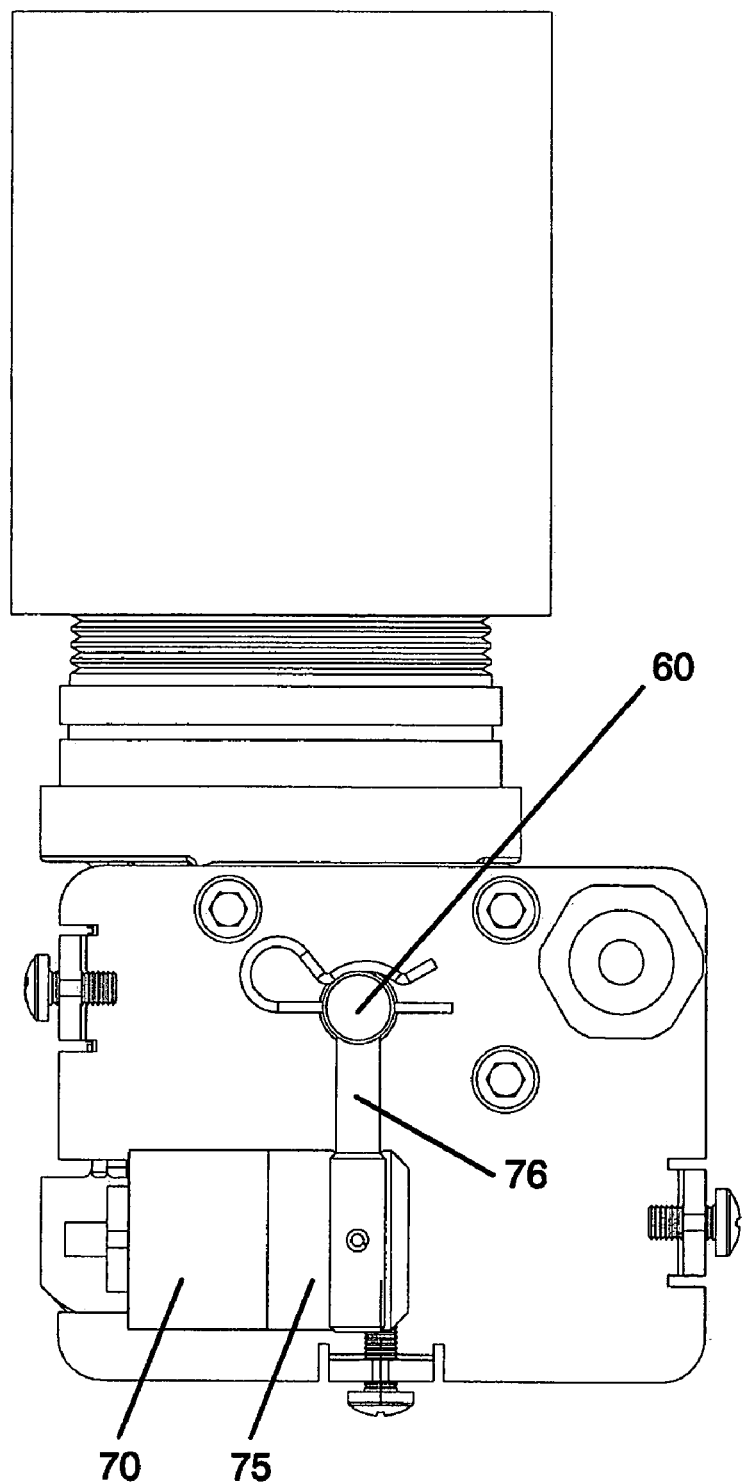
FIG. 9 is a top view of the valve in the open position.

FIG. 9 is a top view of the valve in the open position.

Figure 10:
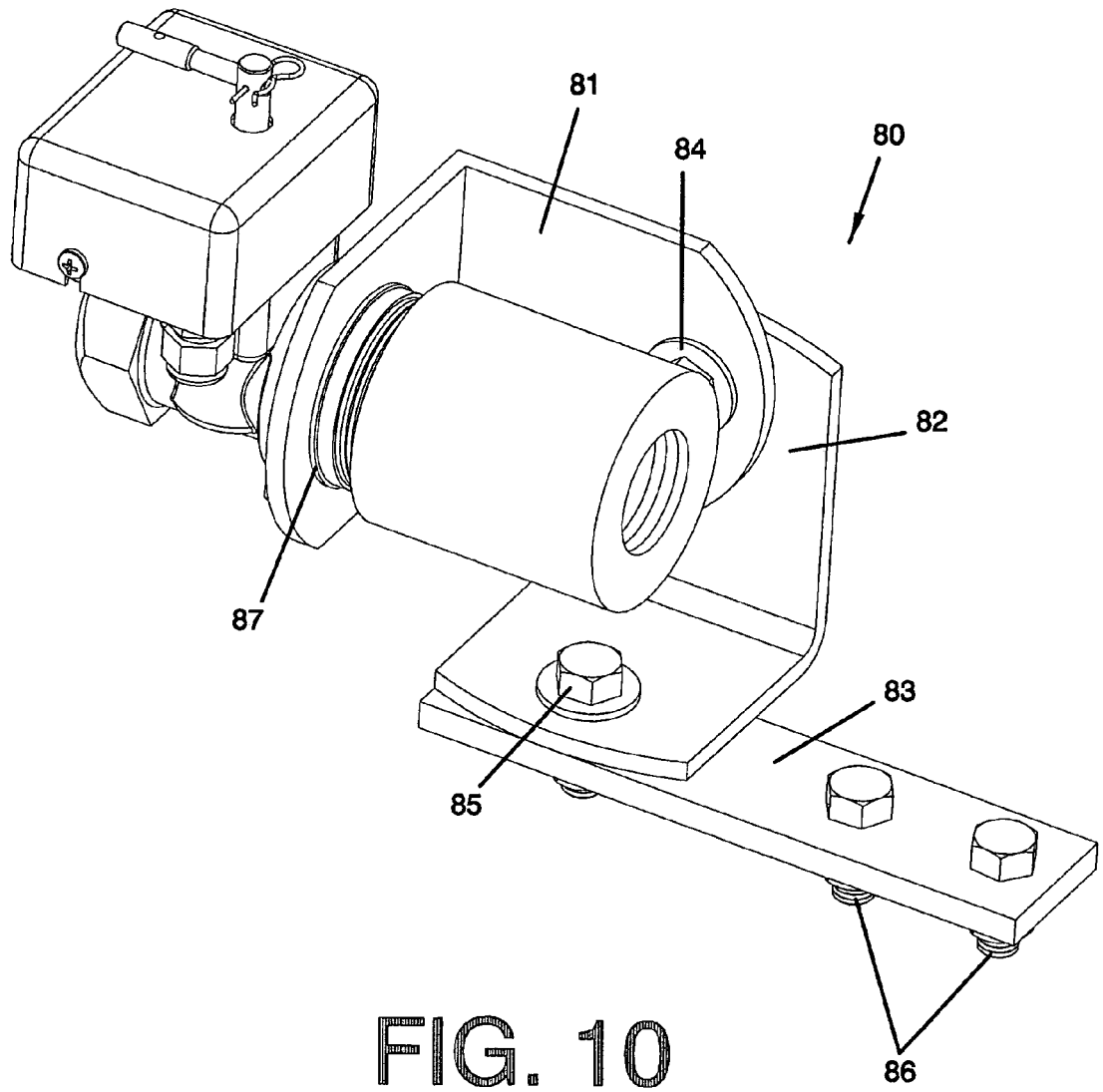
FIG. 10 is an isometric view of the valve mounted on an alternative mounting bracket.

FIG. 10 is an isometric view of valve 10 mounted in an alternate mounting bracket 80. Bracket 80 has 3 degrees of freedom through members 81, 82 and 83 about pivot points 84 and 85 and is attached to the nurse tank frame with mounting bolts 86.

A preferred embodiment uses a safety valve within a "cam over in line" feature, similar the Fisher C407-10 Internal Valve. One may optionally also use the "excess flow" feature inherent in the Fischer design, although a primary reason for the present system involves the inherent unreliability of "excess flow" shutoff valves. Errors in piping a system or the thousands of ways a leak of varying magnitude may occur renders the probability of a fixed excess flow valve closing in response to the leak condition rather small.

The safety valve alternatively may be a ball valve with a torsion spring biasing the valve closed and a magnet holding it open. Using a ball valve may require the use of a larger magnet, since a ball valve has closing drag that is the sum of the drag on the stem seal and the ball against the downstream seat which increases as the ball closes and the upstream pressure presses the ball against the downstream seat. Contrast that to the cam over in line valve, where the only closing friction is from the stem seal and the upstream flow and pressure "helps" to close the valve. This allows the use of a much smaller magnet to operate the system and therefore a smaller and more cost effective system.

The safety valve as disclosed herein is electrically closed as opposed to being manually closed when in the passive (automatic) mode, although manual (active) closure of the valve is also provided. By providing electrical closure when in the passive mode, the following distinct advantages are obtained.

1. The electrical system allows placement of one or more circuit interrupters (palm button switches), as discussed above, on either of the "wings" of the tool bar, thereby allowing the operator to activate the safety system without having to approach the center of the rig to grab a manual cable.

2. Electrical cables are more easy to route to the inside of the cab in a non obtrusive yet perfectly functional fashion than mechanical cables. The cable system must be accessible by the driver "in the cab" and routed such that the driver can "pull" the cable enough to activate the closure mechanism some 20 to 40 feet away at the valve. Slack must be left in the cable to allow for normal operation of the rig and that slack must be pulled out before the cable will be taught enough to trip the closure device at the valve.

3. Every time a nurse tank is changed out, the system must be disconnected and reconnected to the fresh tank. This is easily accomplished electrically and more difficult with the mechanical cable system.

4. The system is self tested every time a nurse tank change out is done. Disconnecting the electrical connector at the hose connection point caused the valve to close and this can be visually observed. When the system is reconnected electrically, the valve lever is turned to the open position and the electrified magnet must hold it open for operations to continue. If not the system has failed "safe" and the cause of the electrical problem can be and must be solved before operations can continue.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A safety system for a mobile anhydrous hydrous ammonia fertilizer system having a nurse tank, a tractor, an ammonia applicator supported on the tractor, and a flexible hose between the nurse tank and the applicator, the safety system comprising:
   a battery power supply;
   a shutdown switch;
   a safety valve for terminating flow of anhydrous ammonia from the nurse tank;
   an electrical conductor between the shutdown switch, the battery power supply, and the safety valve;
   an electrical connector spaced along the electrical conductor and separable during a pull away of the tractor from the nurse tank; and
   the safety valve including an electromagnet powered by the battery power supply for holding the safety valve open, the safety valve automatically closing in response to one of activation of the shutdown switch or separation of the electrical connector.

2. A safety system as defined in claim 1, wherein the safety valve is mounted on a bulkhead secured to the nurse tank.

3. A safety system as defined in claim 1, further comprising:
   a breakaway coupling along the flexible hose from the nurse tank to the applicator.

4. A safety system as defined in claim 1, further comprising:
   another electrical connector positioned adjacent the safety valve for disconnecting the electrical conductor during change out of the nurse tank.

5. A safety system as defined in claim 1, wherein the safety valve includes a manual actuation lever.

6. A safety system as defined in claim 1, wherein the shutdown switch is mounted on the tractor.

7. A safety system as defined in claim 6, wherein the safety valve returns to a closed position after interruption of electrical power to the electromagnet allows the valve to close at least partially in response to flow of anhydrous ammonia.

8. A safety system as defined in claim 1, wherein the safety valve includes a cam rotatable for moving a valve stem to open and close the safety valve.

9. A safety system as defined in claim 1, wherein the safety valve includes a biasing spring to bias the safety valve closed.

10. A safety system as defined in claim 1, further comprising:
   at least a portion of the electrical conductor is wrapped around the flexible hose.

11. A safety system as defined in claim 1, wherein the safety valve is mounted for three degrees of freedom in relation to the nurse tank.

12. A safety system as defined in claim 1, wherein the safety valve includes a linearly movable valve stem and a valve poppet moveable in response to the valve stem to open and close the safety valve.

13. A safety system for a mobile anhydrous hydrous ammonia fertilizer system having a nurse tank, a tractor, an ammonia applicator, and a flexible hose between the nurse tank and the applicator, the safety system comprising:
   a battery power supply;
   a shutdown switch mounted on the tractor;
   a safety valve for terminating flow of anhydrous ammonia from the nurse tank;
   an electrical conductor between the shutdown switch, the battery power supply, and the safety valve;
   an electrical connector spaced along the electrical conductor and separable during a pull away of the tractor from the nurse tank;
   a breakaway coupling along the flexible hose from the nurse tank to the applicator; and
   the safety valve including an electromagnet powered by the battery power supply for holding the safety valve open, the safety valve automatically closing in response to one of activation of the shutdown switch or separation of the electrical connector.

14. A safety system as defined in claim 13, wherein the safety valve includes a cam rotatable for moving a valve stem to open and close the safety valve.

15. A safety system as defined in claim 13, wherein the safety valve returns to a closed position after interruption of electrical power to the electromagnet allows the valve to close at least partially in response to flow of anhydrous ammonia.

16. A safety system as defined in claim 13, wherein the safety valve includes a manual actuation lever.

17. A safety system as defined in claim 13, wherein the safety valve includes a linearly movable valve stem and a valve poppet moveable in response to the valve stem to open and close the safety valve.

18. A safety method for use with a mobile anhydrous hydrous ammonia fertilizer system having a nurse tank, a tractor, an ammonia applicator, and a flexible hose between the nurse tank and the applicator, the method comprising:
   providing a battery power supply;
   positioning a shutdown switch on the tractor;
   providing a safety valve for terminating flow of anhydrous ammonia from the nurse tank;
   connecting an electrical conductor between the shutdown switch, the battery power supply, and the safety valve;
   spacing an electrical connector along the electrical conductor and separable during a pull away of the tractor from the nurse tank; and
   powering an electromagnet of the safety valve from the battery power supply for holding the safety valve open, the safety valve automatically closing in response to one of activation of the shutdown switch or separation of the electrical connector.

19. A method as defined in claim 18, further comprising:
   providing a breakaway coupling along the flexible hose from the nurse tank to the applicator.

20. A method as defined in claim 18, further comprising:
   rotating a cam to move the safety valve between an open position and a closed position.

* * * * *